J. M. YOUNT.

PORTABLE RHEOSTAT FOR WELDING APPARATUS.

APPLICATION FILED OCT. 15, 1913.

Reissued May 26, 1914. 13,739.

WITNESSES:

Charles Pickles

F. E. Maynard

INVENTOR

Jesse M. Yount.

BY G. H. Strong

ATTORNEY

UNITED STATES PATENT OFFICE.

JESSE M. YOUNT, OF SAN FRANCISCO, CALIFORNIA, ASSIGNOR OF ONE-THIRD TO EDWARD S. BRANNAMAN AND ONE-THIRD TO THOMAS FINIGAN, BOTH OF SAN FRANCISCO, CALIFORNIA.

PORTABLE RHEOSTAT FOR WELDING APPARATUS.

13,739. Specification of Reissued Letters Patent. Reissued May 26, 1914.

Original No. 1,046,708, dated December 10, 1912, Serial No. 702,659. Application for reissue filed October 15, 1913. Serial No. 795,390.

*To all whom it may concern:*

Be it known that I, JESSE M. YOUNT, citizen of the United States, residing in the city and county of San Francisco and State of California, have invented new and useful Improvements in Portable Rheostats for Welding Apparatus, of which the following is a specification.

This invention relates to a rheostat designed particularly for ready, easy and rapid arrangement where welding operations are to be performed, the current being tapped from a direct current source such as that of a street railway system.

The object of the present invention is to design and provide a rheostat arranged in a suitable mounting or box which is provided with means whereby the rheostat may be readily moved from position to position and whereby the apparatus may be quickly lowered to and swung from the ground or other surface by means of a crane, which may be on a motor car or elsewhere.

The invention consists of a rheostat structure having suitable connections for coupling with a source of current, the structure being provided with suitable connections or electric terminals and having attachments for connection with a lifting crane or other hoisting apparatus.

Figure 1:
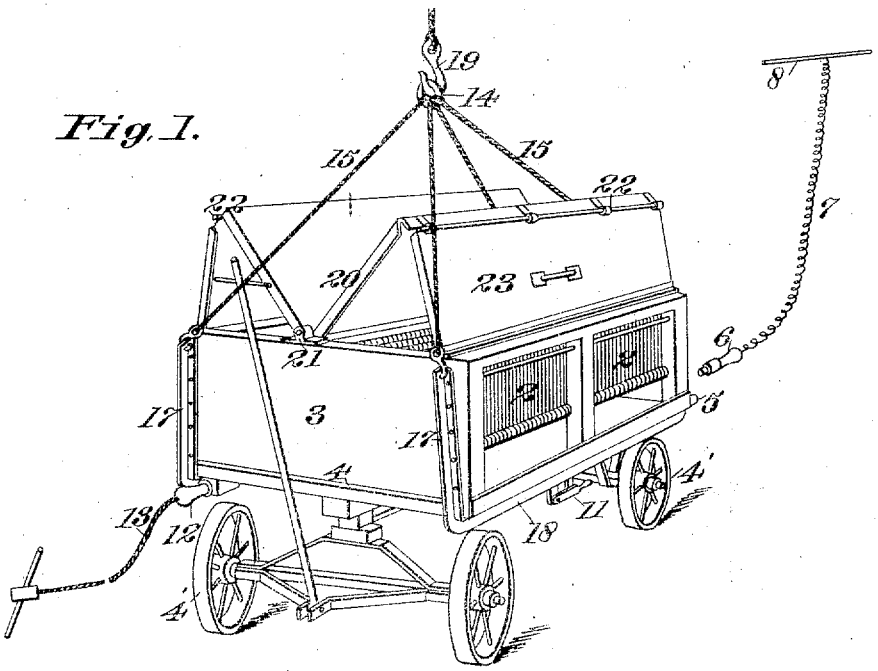
Figure 2:
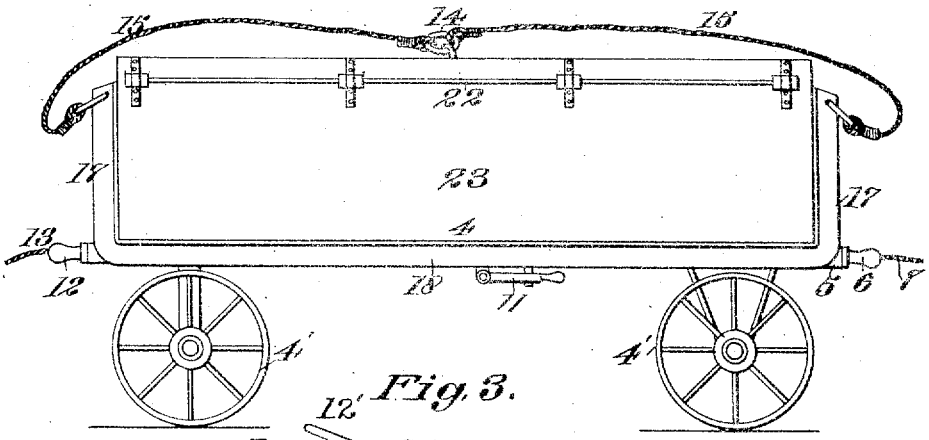
Figure 3:
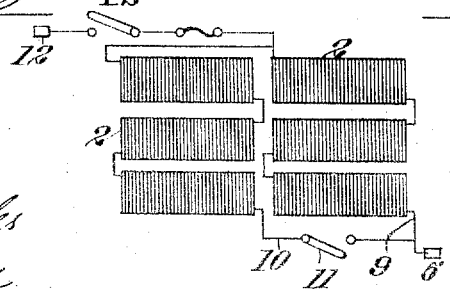

Figure 1 is a perspective view of the sling rheostat. Fig. 2 is a side elevation of the improved apparatus. Fig. 3 is a diagram of the wiring.

In its illustrated form the invention is shown as comprising a number of electric resistance elements 2, of appropriate material, which may be mounted or suspended in a box having end walls 3 and a suitable bottom 4, the box being provided with vehicle wheels 4′ permitting the easy movement between adjacent points during the use of the apparatus.

The box 3 is provided with a socket or coupling device 5 into which may be inserted a plug 6 having a wire 7 connected to a source of current 8, which may be a trolley line. One wire as 9 from the connection 5 leads to one set of resistance elements 2 and a branch wire 10 from the line 9 connects to another set of the resistance elements 2, a switch 11 being introduced in the multiple line 10. When the switch 11 is closed the current is directed through both sets of the resistance elements 2; when opened, then through one set. The current after traversing the resistance members may be delivered to the place of operation through a coupling or plug 12 connected to the work line 13 to which may be connected a welding tool.

For the purpose of quickly adjusting the apparatus for operation and for enabling it to be transported rapidly from place to place, the apparatus is provided with a bull ring 14 which is connected by a plurality of cables, or other suitable means 15, to a convenient portion of the box and in the present instance the ends of the cables 15 are secured to the upper ends of substantial U shaped bars 17, which are secured to the ends of the box 3; each of the braces 17 continuing downwardly and longitudinally across the bottom of the box, as as 18, forming a substantial binder for the box and at the same time providing a dependable means of connection for the cables 15.

When it is desired to transport the apparatus or to lift it from one position to another, or from the ground to a car, the bull ring 14 is engaged by a lifting device, as a hook 19, of a crane or hoist, and the apparatus easily and safely moved.

From the foregoing it will be seen that I have provided a simple, substantial, easily transported and adjusted resistance apparatus, which can be quickly placed for operation, and when electrically connected to a source of supply will enable the use of a welding tool to which may be supplied current of the desired strength by the adjustment of the rheostat switch 11 or cut out by switch 12′, Fig. 3.

For the purpose of thoroughly ventilating the resistance elements during their use the box is provided with covers 20 which are hinged at 21 to the ends 3, and to the longer edge of each of the covers 20 is hinged, as at 22, sides 23; the covers and sides being adapted for effectually covering the resistance elements when lowered; when the covers are raised to the position shown in Fig. 1, the resistance elements are open to the free circulation of air and yet the hingedly connected covers and sides form a roof protecting the apparatus from rain or snow and also preventing the accidental injury to or short circuiting through the resistance elements by foreign pieces falling on their upper surfaces.

Having thus described my invention, what I claim and desire to secure by Letters Patent is—

1. A portable rheostat comprising a frame mounted on carrying wheels, resistance elements mounted in the frame, supply and work line connections with the resistance elements and covers connected with the frame to inclose the resistance elements while being transported and adjustable to expose the elements for effective ventilation while in use.

2. A portable rheostat comprising a rigid portable frame, resistance elements mounted in the frame, supply and work line connections with the resistance elements and jointed covers hinged on the frame and movable to inclose the elements while being transported and to freely expose the elements for ventilation, while in use.

3. A mounting for portable rheostats consisting of a box, and resistance means contained therein, said box having lengthwise extending U-shaped L's extending down at the ends of the box and thence across the bottom thereof forming a cradle in which the box rests.

4. A portable rheostat consisting of a frame mounted on wheels, said frame having means for supporting the resistance elements, suitable electric connections, adjustable covers for the frame whereby the resistance elements may be exposed for ventilation, and a connection secured to the frame for coupling to a hoist.

5. In a rheostat mounted on a portable frame, means adjustable to expose the rheostat for ventilation and form a roof therefor, or adjustable to inclose the same, a disconnectible conductor joining the rheostat and power line and permitting movement of the rheostat from position to position, a work-line connectible with the rheostat, and a device secured to the frame for coupling the same to a hoist.

6. A mounting for portable rheostats consisting of a box, resistance means contained therein, said box having lengthwise extending U-shaped L's extending down at the ends of the box and thence across the bottom thereof forming a cradle in which the box rests, and the upper ends of the L's having eyes to which a sling is connected whereby the entire rheostat may be hoisted and moved conveniently.

7. A portable rheostat comprising a frame, suitable electric connections for the rheostat including a flexible connection with a supply-line and a work-line, adjustable covers for the rheostat whereby the same may be exposed for ventilation, and means on the frame for connecting with a hoist.

In testimony whereof I have hereunto set my hand in the presence of two subscribing witnesses.

San Francisco, Cal., October 7, 1913.

JESSE M. YOUNT.

Witnesses:

W. W. HEALEY,

JOHN H. HERRING.